United States Patent
Fluhr

[15] 3,671,966
[45] June 20, 1972

[54] MULTIPLE TARGET SEPARATOR

[72] Inventor: Frederick R. Fluhr, Oxon Hill, Md.

[73] Assignee: The United States of America as represented by the Secretary of the Navy

[22] Filed: Aug. 27, 1970

[21] Appl. No.: 67,328

[52] U.S. Cl. .................................... 343/6.5 R, 343/5 EM
[51] Int. Cl. ................................................. G01s 9/56
[58] Field of Search ................. 343/6.5 R, 6 R, 5 EM, 5 PC

[56] References Cited

UNITED STATES PATENTS

| 3,312,970 | 4/1967 | Bond | 343/6.5 R |
| 3,331,068 | 7/1967 | Busignies | 343/6.5 R |
| 3,228,793 | 6/1967 | McLaughlin et al. | 343/5 EM |
| 3,298,021 | 1/1967 | Jacobs et al. | 343/5 EM |

Primary Examiner—Benjamin A. Borchelt
Assistant Examiner—Gregory E. Montone
Attorney—R. S. Sciascia, Arthur L. Branning, J. G. Murray and S. Sheinbein

[57] ABSTRACT

A system for separating and identifying multiple targets within a PPI positioned gate area on a Radar IFF display. The IFF target separator acts upon the IFF response times within the gate and separates the targets in range order regardless of the order of arrival times of the target responses. The targets on the PPI can thus be associated with their respective IFF code readouts.

7 Claims, 2 Drawing Figures

INVENTOR.
FREDERICK R. FLUHR

MULTIPLE TARGET SEPARATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to an IFF active readout control and display and more particularly to a PPI type system wherein maximum use is made of target IFF replies in any one of several modes to furnish a numerical and coordinate position display of the target identified.

There are many security sensitive areas where air traffic must not only be controlled in the conventional sense, which is in itself a highly complex problem, but must also be completely identified. Identification is usually accomplished by some form of IFF (Identification Friend or Foe) where the surface station transmits an interrogating signal which energizes a transponder on friendly aircraft to transmit a coded signal that includes the identity of the aircraft and often its altitude. The processing of the IFF response signals at the surface station is a most critical problem for the air controller, particularly when the volume of air traffic is large. Because of the excessive time required to determine the identity of each aircraft, the prior IFF reply display and processing system have generally been regarded as inadequate.

It is frequently desirable to track and record for future reference the positions of a plurality of airborne objects relative to a predetermined point on the ground. Obviously this could be done by employing a plurality of tracking radars, one for each object, each radar continuously tracking and providing azimuth, elevation and range data for its particular object. However, such an arrangement becomes prohibitively expensive where more than a relatively few objects are to be tracked. Moreover, the problem of designing the individual radar unit so that it will track only its one particular object, despite the presence of several other similar objects in the same general area, is extremely difficult and makes such a system impractical.

In IFF/Radar display and processing system, there is a continuing need for separating and identifying multiple targets within a PPI positioned gate area. In IFF, if several targets are in the position gate area (the gate area positioned over the targets of interest or area on the plan position indicator, PPI), the displayed and decoded IFF codes cannot be reliably associated with the respective targets in the gated area.

SUMMARY OF THE INVENTION

The general purpose of this invention is to provide an improved IFF reply display and processing system wherein unambiguous processing of the IFF/Radar data occurring within a PPI position gate area can be made even if multiple targets are located within this gate area. This is accomplished by a system which includes a radar plan position indicator (PPI) and a light pencil(or any other standard gate position control method such as "joy stick" etc.) controlled by the operator selecting the gated area. Logic circuitry is disclosed which permits multiple target separation by storing the ranges of the targets within the gated area irrespective of the order in which they were detected and then displaying the SIF (Selective Identification Feature) codes on a readout display in the correct range order.

OBJECTS OF THE INVENTION

It is therefore an object of the present invention to provide an improved IFF reply display and processing system.

A further object of the present invention is to provide an improved IFF system wherein maximum use is made of the IFF target replies.

Another object of the present invention is to increase the reliability of IFF identification.

Yet another object of the present invention is to provide unambiguous processing of IFF data occurring within a PPI position gate area.

A still further object of the present invention is to provide separation of multiple targets within a PPI positioned gate area.

Further objects of the invention will become apparent from the following description and claims especially when considered in conjunction with the drawings wherein:

DESCRIPTION OF THE THE PREFERRED EMBODIMENT

Figure 1:
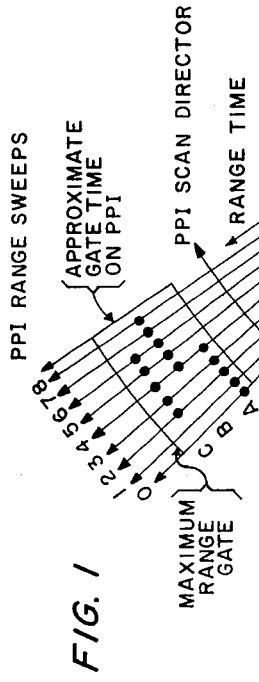
FIG. 1 shows part of a picture displayed on the screen of a plan position indicator.

Referring now to FIG. 1, during PPI sweep O, target A would provide a response. On sweep 2, targets A and C would respond in range sequence. On sweep 4, all three targets A, B and C would respond in order of range, target B responding earlier in range sequence than target C. The problem is to sort these radar responses and keep them in proper order so that IFF processing systems which require two or more IFF responses for proper decoding will not mix target responses from more than one target.

Figure 2:
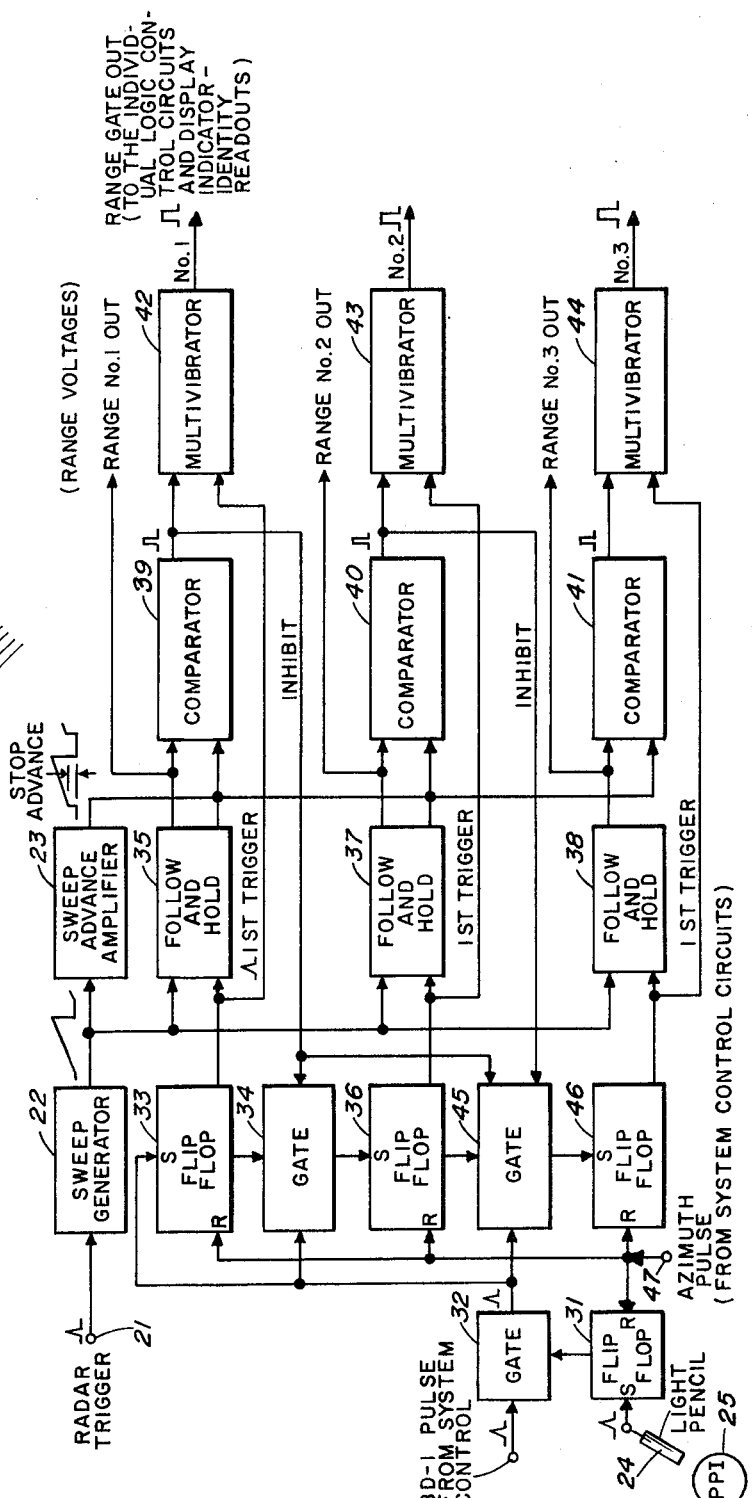
FIG. 2 is a block diagram illustrating the general principles of the invention.

For situations which would require it, the apparatus shown in FIG. 2 allows for the handling of several simultaneous Identity Readouts operating from a single PPI gate action and maintains the association of the target on the PPI and the readout display. The multiple target separator maintains the order in range regardless of which target is sensed first in time by the operator gating action. A possible situation as illustrated in FIG. 1 will be used to explain the operation of the apparatus shown in FIG. 2.

In FIG. 2, the radar IFF trigger at input 21 initiates sweep generator 22 to develop a range sweep voltage at the pulse repetition frequency of the radar. Since FIG. 2 is illustrating a three-target capability (which can be as many as desired), the sweep generator drives the three follow-and-hold circuits, 35, 37 and 38. The range sweep generator 22 also drives the sweep advance amplifier 23. This amplifier can perform two functions depending on the type of operation desired. The range sweep can be put on a controlled pedestal in order to advance the subsequent range gates a fixed range increment prior to the target being gated. This compensates for the various cumulative delays which can occur in the system. Also the sweep advance amplifier 23 can be set to increase the range sweep slope, and provide a percentage of range increase for the early range increment, thus accomodating radar system range errors. Either or both of these functions can be provided depending on operational conditions. The output of the sweep advance amplifier drives the inputs to the three comparators, 39, 40, 41. The follow-and-hold circuits 35, 37, 38 drive the other inputs to the comparators 39, 40 and 41. The comparators 39, 40, 41 drive the range gate multivibrators 42, 43, 44 whose outputs are used by the system control to turn on the proper readout indicators (not shown).

Since the PPI display 25 usually has a high volume of targets displayed, it is necessary for the operator to quickly select a target or area for IFF evaluation. Many suitable devices have been developed for this purpose, one being a "light pencil" gate control in U.S. Pat. No. 3,328,793 issued to Donald J. McLaughlin and Frederick R. Fluhr. While a fuller description is available in the referred to patent, the reader will find the following description of the "light pencil" 24 gate control sufficient for the purpose of comprehending the disclosure of the present invention.

The light pencil 24 consists of two separated fiber optic bundles in coaxial arrangement. The first outer annular shaped bundle allows a light to be directed onto the PPI 25 so as to select target video for identification. The inner bundle transmits the light flashes from the selected target video to the detection and processing circuits to gate in the SIF (Selective Identification Feature) code corresponding to the selected target. Thus, the light pencil 24 allows the operator to pinpoint a target which he wishes to identify. SIF information code consists of a series of one-zero conditions and the exact number of bit positions can vary according to the particular system and the volume of information to be contained therein. This signal is fed to the numerical readout lamps (not shown). When the operator places the light detector portion of the light pencil 24 over the PPI target to be identified, the light flashes from the PPI 25 are detected and converted to electrical pulses which set flip-flop 31.

In operation, when the PPI position gate (on the order of 10 nmi 10° is positioned over an area that may contain several IFF targets, the first light pulse from the light probe sets flip-flop 31, thus enabling gate 32. The first target bracket decode pulse BD-1 representing an IFF reply, sets flip-flop 33 which in turn enables gate 34 and sets the follow-and-hold 35 into the "hold" state, thus deriving target range. If there is a second BD-1 pulse present (indicating a second target) before the maximum range gate in the systems control, flip-flop 36 is set. This action derives and holds the range of the second target in follow-and-hold 37. This action will continue if a third target is present before the end of the system control maximum range gate. The target separator as illustrated will handle three targets separated in range on a single sweep or on any subsequent sweep within the azimuth gating period. The range values held by the follow-and-hold circuits are compared with subsequent range sweeps and provide the individual target range gate periods. The output of the comparator circuit 39, besides triggering range multivibrator 42, provides an inhibit pulse to gates 34 and 45. Thus, follow-and-hold circuits 37 and 38 will not act on the range value held by follow-and-hold 38. Comparator 40 inhibits follow-and-hold 38 in a similar manner so that it will not act on the value going into follow-and-hold 35. After all three follow-and-hold circuits acquire range values, the inhibit pulses are not longer required.

An example of the operation of the multiple target separator is illustrated by the possible situation of three targets within the PPI gate as shown in FIG. 1. When the operator aims his light probe 24 at the target area to be gated, the first light pulse is generated by target A on sweep O. This light pulse sets flip-flop 31 and thus enables gate 32. When the target A BD-1 pulse, passes through gate 32, it sets flip-flop 33. Flop-flop 33 sets follow-and-hold 35 to the "hold" state and thus derives target A range. The setting of flip-flop 33 also triggers multivibrator 42, thus deriving the range gate for target A. Since there are no other targets following target A on sweep O, the system control maximum range gate operates as indicated in FIG. 1. On the next range weep, the target A comparator 39 pulse triggers multivibrator 42, thus providing the target A range gate. Comparator 39 also inhibits gate 34 and gate 45 at target A range only so that target A will not be stored in follow-and-hold circuits 37 and 38. Again there are no other targets on range sweep 1 within the system control maximum gate. On the next sweep, sweep 2, the action of target A is repeated except that the BD-1 pulse of target C passes through gate 34 and sets flip-flop 36. This triggers multivibrator 43 and sets follow-and-hold 37 to "hold" thus deriving target C range and providing its range gate. This action repeats until target B is acquired by follow-and-hold 38.

Multivibrators 42, 43, 44 could be turned off by command before they complete their range gate period. The sequence in which the circuits operate is determined by the sequence of enable signals, and the ranges stored by each circuit can be any of the range of values presented by the PPI position gate. When the position gate period is ended, the system is cleared by a pulse on lead 47 to reset flip-flops 33, 36 and 46. The responding target whose SIF code is being displayed is identified on the PPI by a video mark following the target the instant the final decision is made.

The technique described above allows unambiguous processing of the IFF/Radar data occurring within a PPI position gate area. The technique receives the responses in any time sequence either/and range and azimuth and provides the correct range gating so that later signal and display processing will not mix target responses and provide an unambiguous correlation between the PPI target and its associated SIF code. This technique can be implemented by digital techniques as well as by an analog method outlined above. While the technique described uses an operator held light probe to perform the PPI target gating, any other positioning method will work just as well, through the light probe requires no modification to the PPI.

Obviously many modifications and variations are possible in light of the above teachings. It is therefore to be understood that within the scope of the appended claims the invention may be practiced otherwise than as specifically described.

What is claimed and desired to be secured by Letters Patent of the United States is:

1. An IFF processing system for separation of multiple radar targets on a plan position indicator and associating each target with its IFF reply comprising:
    means for selecting a gated area on said plan position area;
    bistable means coupled to said selecting means, said selecting means setting said bistable means upon detection of a target within said gated area means;
    a follow and hold circuit coupled to said bistable means;
    means for driving said follow and hold circuits;
    whereby said bistable means transmits a pulse to said follow and hold circuit upon being set, thereby holding the range of said detected target.

2. An IFF system as recited in claim 1, wherein:
    said driving means is a sweep generator developing a range sweep voltage at the pulse repetition frequency of the radar; and
    a sweep advance amplifier coupled to said sweep generator for advancing said gated area.

3. An IFF system as recited in claim 2, including:
    a plurality of bistable means;
    a plurality of follow and hold circuits coupled to said plurality of bistable means for storing the range of a plurality of targets within said gated area.

4. An IFF system as recited in claim 3, including comparator means coupled to said follow and hold circuits and said sweep advance amplifier for comparing two consecutive ranges, said comparator outputs inhibiting ensuing follow and hold circuits from storing the same range.

5. An IFF system as recited in claim 4, including multivibrator means coupled to said comparator means for supplying a range gate signal to the IFF readout upon receiving a signal from said comparator means.

6. An IFF system as recited in claim 5, wherein: said selecting means is a light pencil.

7. An IFF system as recited in claim 6, including means for resetting said bistable means after said gated area period is ended.

* * * * *